Jan. 5, 1965   R. L. CARLSTEDT   3,164,041
BORING BAR
Filed Nov. 13, 1962
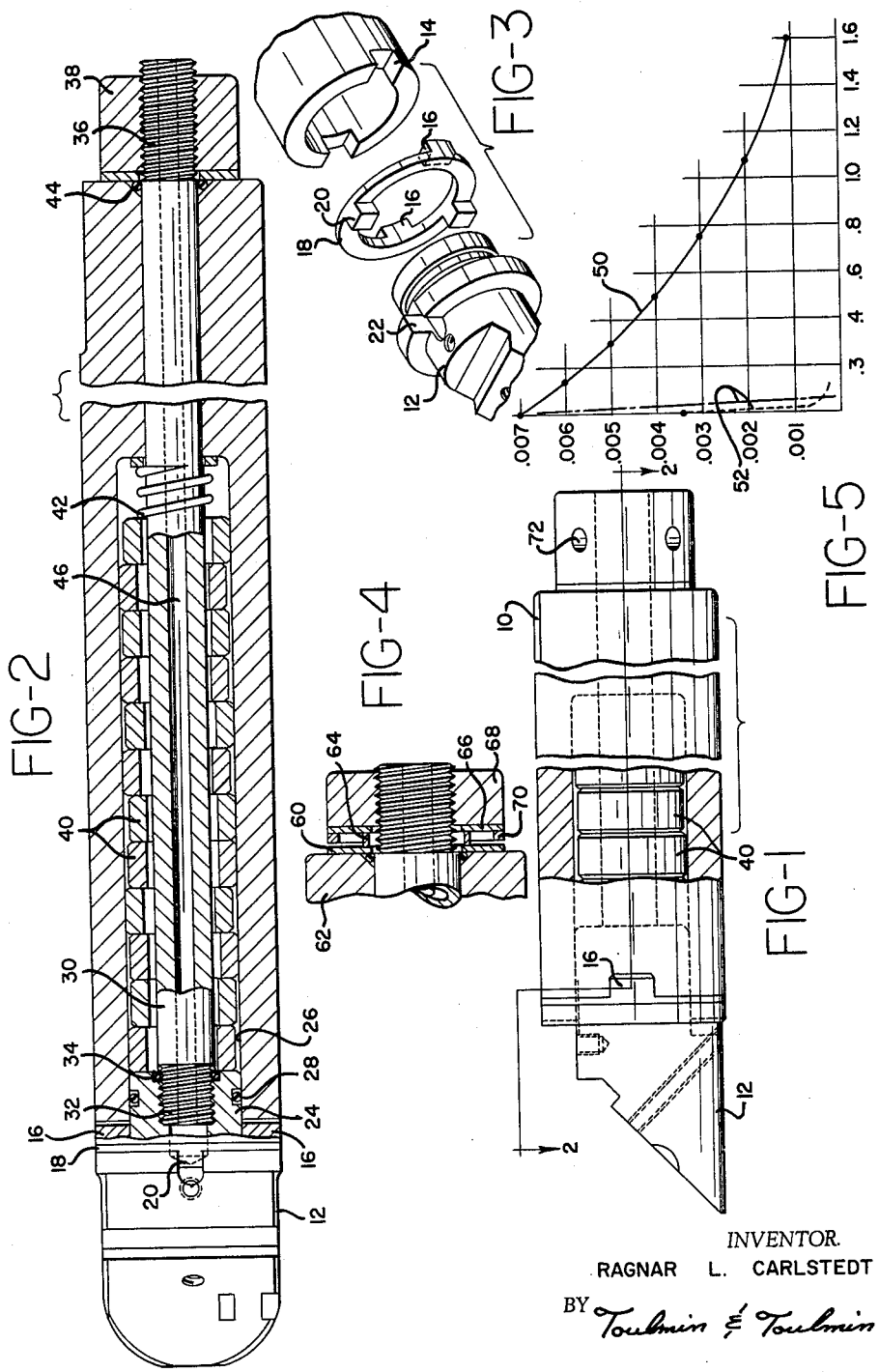
INVENTOR.
RAGNAR L. CARLSTEDT
BY Toulmin & Toulmin
ATTORNEYS

United States Patent Office 3,164,041
Patented Jan. 5, 1965

3,164,041
BORING BAR
Ragnar L. Carlstedt, Ligonier, Pa., assignor to Kennametal, Inc., Latrobe, Pa., a corporation of Pennsylvania
Filed Nov. 13, 1962, Ser. No. 237,188
7 Claims. (Cl. 77—58)

This invention relates to boring bars, particularly boring bars formed of cemented carbides, and, more particularly still, to a boring bar of this nature including therein a vibration damping device.

Boring bars of cemented carbide are an important item of commerce on account of the great strength and rigidity of boring bars formed of this material. The deflection of such a boring bar is smaller than a boring bar formed of steel and, for this reason, more rapid and accurate machining can be carried out when using a cemented carbide boring bar.

A drawback in connection with cemented carbide boring bars, however, is that this material is quite weak in tension and, if loaded in torsion, or is subjected to too great a bending stress, the material will fracture even though stresses that may at the same time be imposed thereon in compression are much below the ultimate strength of the material.

Another drawback that has existed in connection with boring bars of this nature is that heretofore the steel cutting element support member provided at the end of the boring bar was either brazed thereto or cemented thereon as by an epoxy resin or a like high strength adhesive material. When the steel cutting element was brazed to the carbide bar, stresses were introduced at the joint due to large differences in coefficients of thermal expansion. This often caused failure of the boring bar at the joint. Therefore on larger size boring bars the steel cutting element was cemented with epoxy resin to the carbide bar. However, the shear and tensile strength of the epoxy joint was not large enough to utilize full benefit of the stiffer carbide bar (without making the joint very long which would cause a decrease in the efficiency of the vibration eliminating device, mentioned below). On account of this method of mounting the steel cutting element support member on the end of the boring bar, it was necessary to maintain a substantial inventory of boring bars of different types in order to be able quickly to fill orders without the delay of fabricating the boring bar or at least fixing the steel support member to the end thereof.

Boring bars of this nature have been provided with a vibration eliminating device carried in a cavity within the boring bar. This represents an important advance in the art of manufacturing cemented carbide boring bars because these bars, on account of their extreme stiffness, tend to vibrate which, of course, not only detracts from the accuracy and finish of the workpiece being machined, but it also creates high stresses in the boring bar that can lead to fracturing thereof.

While vibration damping devices as referred to have proved to be successful to an outstanding degree, it is, nevertheless, the case that the cross section of the boring bar is somewhat reduced on account of the cavity formed therein for the vibration damping device and this tends to reduce the strength of the boring bar to below the maximum that could be realized from a boring bar of any given diameter.

The present invention overcomes the difficulties referred to above by providing a sintered or cemented carbide boring bar or a like tool in which the main bar portion or shank is cemented carbide while the cutting element holder is a steel member keyed to the outer end of the shank and sealed thereto and clamped thereon under a predetermined preload.

The shank or bar is provided with a cavity in which a damping device is located to inhibit vibration of the device when placed under load. The means clamping the support member on the shank is a drawbar extending completely through the shank which imposes a compressive preload on the shank which serves to permit substantially the full strength of the boring bar shank to be developed when the tool is in use.

With the foregoing in mind, it is a primary objective of the present invention to provide a cemented carbide boring bar in which the ultimate strength of the material can be fully developed.

It is another object of this invention to provide a cemented carbide boring bar in which the steel cutting element supporting member at the one end of the boring bar is fixed thereto, but without employing brazing or adhesives to join the support member to the boring bar.

Still another object of this invention is the provision of a cemented carbide boring bar having a cavity therein for receiving a vibration damping device, but in connection with which the strength of the boring bar is not impaired by the provision of the cavity therein and through which boring bar a supply of coolant can be passed to the working area.

These and other objects and advantages of this invention will become more apparent upon reference to the following specification, taken in connection with the accompanying drawings, in which:

FIGURE 1 is a side elevational view, partly broken out, showing a cemented carbide boring bar according to the present invention with a vibration damping device therein and with a steel cutting element support member secured to one end of the boring bar;

FIGURE 2 is a plan sectional view through the boring bar and is indicated by line 2—2 on FIGURE 1;

FIGURE 3 is an exploded perspective view showing more in detail the manner in which the steel cutting element support member is attached to the carbide bar and held thereon against rotation;

FIGURE 4 is a sectional view at the rear end of the boring bar showing a special washer arrangement that is employed for determining the preload that is placed on the drawbar that holds the steel support member on the end of the boring bar; and FIGURE 5 is a graph showing the effectiveness of the vibration damping device for damping out vibrations induced in the boring bar.

Referring to the drawings somewhat more in detail, and with particular reference to FIGURES 1, 2 and 3, the present invention concerns a boring bar 10 which is a cemented carbide member. This member is formed by molding of powders and the sintering thereof to substantially the final configuration. Machining operations on the cemented carbide, on account of the great hardness thereof, are carried out only with extreme difficulty and must be kept to a minimum.

For this reason, it has heretofore been the practice to cement or braze a steel cutting element support member to the one end of the carbide boring bar. In FIGURES 1, 2, and 3, this steel cutting element support member is indicated at 12. It will be understood that the particular support member 12 illustrated is only exemplary of the configuration that this member might take.

This member is provided because, being of steel, it can be machined to provide means for supporting and clamping a cutting element thereto, whereas, such machining of the carbide boring bar would be practically impossible.

According to the present invention, the carbide boring bar at its outer end, namely, the end that receives the support member, is formed with notches 14 therein that receive the lugs 16 of a disc key 18 having corresponding lugs 20 extending from the opposite face that are receivable in the notches 22 of the support member 12. The key member 18 thus provides an arrangement for fixing the support member to the boring bar and for transmitting discs therebetween to which the support member is subjected during a cutting operation.

The key member 18 has an internal diameter that will receive the shank 24 of the support member and this shank extends into the mouth of the recess or bore 26 formed in the boring bar. Shank 24 has an annular groove therein in which is placed an O-ring 28 so that a fluid tight seal is had between the shank 24 and the bore 26.

According to the present invention, the support member is held on the boring bar by a drawbar 30 that extends axially completely through the boring bar and which is threadedly connected at 32 to the shank 24 of the support member. The threaded connection of the drawbar with the support member is preferably made fluid tight by the provision of suitable sealing means therebetween such as an epoxy resin ring indicated at 34 in FIGURE 2.

Epoxy resin applied to the threads of the drawbar will also set up about the threads and will form a permanent fluid tight connection between the boring bar and the support member 12. These members could, of course, be welded or brazed together if so desired.

The drawbar at its end opposite support member 12 has threads 36 thereon for receiving a nut 38. Nut 38 is employed for tensioning the boring bar 30 to a desired degree so that the boring bar, with respect to the cemented carbide portion thereof, is in a certain state of precomposition. This is an important feature of the present invention because, with the boring bar in a state of precompression, or preload, it is possible more nearly to develop the full strength of the material on the boring bar than is possible if the support member is brazed or welded to the end thereof.

This comes about because substantially any use to which the boring bar would be put would induce tensional stresses in the material of the boring bar which is a type of stress that cemented carbide material is very inefficient in sustaining.

Normally, the member being machined by the boring bar will be rotating, and this will induce torsional stresses in the boring bar which, of course, will place regions of the boring bar in tension. Similarly, with most machining operations, the boring bar will be unilaterally loaded at the cutting tool end and this will impose tensile stresses on the material of the bar. By preloading or prestressing the boring bar with drawbar 30, the possibility of the bar fracturing on account of these tensile stresses can be greatly reduced because tensile stresses are prevented from developing to the same high degree.

The extremely high compressive strength of the cemented carbide material permits this prestressing to be accomplished without imposing any objectionably high compressive stresses on the material.

On account of the high pressure at the joint between the steel cutting element and the carbide bar, caused by the preloaded drawbar the friction in the joint will eliminate or at least, substantially decrease the forces exerted by the lugs in the notches 14 on the carbide bar. As a matter of fact the unit pressure in the joint will vary, dependent on the size of the boring bar, in the range of between 16,000 p.s.i. and 40,000 p.s.i. By way of example, a boring bar having a one inch diameter with a cavity therein of .575 inch in diameter is preloaded to an amount of 13,500 pounds by the drawbar.

A carbide bar having one and one-half inches outside diameter and a cavity with a diameter of .875 inch would be preloaded to an amount of 18,000 pounds by the drawbar.

A two inch outside diameter bar with a cavity therein having a diameter of 1.170 inches would be preloaded to an amount of 29,000 pounds.

It has been mentioned that a vibration damping device is included within the structure of the boring bar and this is best illustrated in FIGURE 2. In FIGURE 2, it will be seen that disposed within cavity 26 in face to face engagement and surrounding drawbar 30 are a plurality of disc-like weights 40. These weights are held in face to face engagement by the provision of a spring 42 in the bottom of the cavity 26.

It has already been mentioned that the end of the cavity adjacent support member 12 is sealed by the provision of O-ring 28 and the sealing of the drawbar to the support member and the other end of the cavity is also sealed by the provision of the sealing ring 44 surrounding the drawbar at the end opposite support member 12. In this manner, the cavity 26 is entirely sealed off from coolant fluid which, according to the present invention, is supplied to the cutting region via passage 46 extending through the drawbar.

The weights 40, which are high specific gravity elements, the said specific gravity being as much as seventeen, differ slightly in diameter, say, varying from two to four thousandths of an inch from each other and these weights also have clearance within the cavity 26. This clearance may also be on the order of about two to four thousandths of an inch.

The freedom of lateral movement of the disc weights 40 within the cavity, together with the varying diameters thereof, set up a strong damping action if the boring bar tends to vibrate. This particularly comes about apparently on account of the impacts delivered to the inside of cavity 26 by the disc-like weights and which impacts will be in a completely random pattern thereby vibrations of substantially any frequency will be damped out.

The effect of the damping weights is illustrated in FIGURE 5 wherein the solid graph line 50 shows the decay rate of vibrations set up in a carbide bar or shank without any weights within it.

The other lines, which are broken and which are indicated at 52, show two different conditions which occur when damping weights are provided in the recess of the tool shank or boring bar. It will be noted that the decay rate when the damping weights are provided is extremely high as compared to the conditions that exist when the bar is without damping weights therein.

The full effectiveness of the weights can only be realized when they are completely dry and, for this reason, the cavity 26 is carefully sealed in the manner described above.

For the purpose of making a simple determination of the proper tension on the drawbar, there may be employed the washer arrangement illustrated in FIGURE 4. In this figure, there is an inner washer member 60 that engages the end of the tool shank or boring bar 62 and washer 60 carries a deformable sleeve 64. This sleeve is adapted for deforming engagement by a second washer portion 66 disposed beneath nut 68.

Loosely disposed between washers 60 and 66 is a ring 70 which is free to rotate in this space.

This arrangement is such that a predetermined axial loading is required to deform sleeve 64 to the point that ring 70 can no longer turn. By selecting sleeve 64 to the proper dimensions, it becomes a simple matter to preload the drawbar to a desired degree merely by drawing up nut 68 until ring 70 is held against rotation. At this time, the drawbar will be subjected to a predetermined degree of tensile stress.

The drawbar can be constructed as illustrated with threads on both ends or, where the length of the drawbar is known, the nuts which have been identified at 38 and 68 could form an integral part of the drawbar and merely the left end of the drawbar where it engages the shank of the support member would be threaded. With this in mind, FIGURE 1 shows spanner wrench holes 72 which could be provided if the nut were formed integrally with the remainder of the drawbar.

Means is provided for supplying coolant directly through the drawbar to the cutting region adjacent the cutting tool element support member while, at the same time, the cavity containing the vibration damping device is completely sealed off from the outside of the boring bar so that no moisture, or oil, or foreign matter can get into the cavity.

It will be understood that this invention is susceptible to modification in order to adapt it to different usages and conditions; and, accordingly, it is desired to comprehend such modifications within this invention as may fall within the scope of the appended claims.

I claim:

1. In a boring bar; an elongated hollow cemented carbide shank, a steel cutting element support member at one end of said shank, a drawbar fixed to said support member and extending through the shank, means at the end of the drawbar opposite the support member for preloading said drawbar in tension to a predetermined measured degree, and a ring-like key member disposed between the support member and the adjacent end of said shank having lug means on opposite sides thereof drivingly engaging both the shank and the support member.

2. In a boring bar; an elongated hollow cemented carbide shank, a steel cutting element support member at one end of said shank, a cylindrical portion on the support member fitting into the end of the hollow shank, a drawbar fixed to said cylindrical portion of said support member and extending axially through the shank, means at the end of the drawbar opposite the support member for preloading said drawbar in tension to a predetermined measured degree, and a key member surrounding said cylindrical portion of said support member and disposed between the support member and the adjacent end of said shank and drivingly interconnecting the shank and the support member, said key comprising a ring having circumferentially spaced lugs extending axially from opposite sides thereof and said support member and shank being formed with axial notches for receiving said lugs.

3. In a boring bar; a cemented carbide shank portion with a bore extending axially therethrough, a steel cutting element support member at one end of said boring bar, key means disposed between said support member and the adjacent end of said shank portion for keying the support member to the shank portion, said support member having a cylindrical portion extending through said key and into the end of the bore in said shank portion, a drawbar fixed to said cylindrical portion of said support member and extending axially through the bore in said shank portion, means at the end of said drawbar opposite the support member for placing the drawbar under a predetermined measured tensile prestress thereby to clamp the support member to the end of the shank portion and to place the shank portion in compression, and vibration damping means in the form of a plurality of heavy independently movable weights in face to face relation contained within said shank portion.

4. In a boring bar; a cemented carbide shank portion with the bore extending axially therethrough, a steel cutting element support member at one end of said boring bar, key means disposed between said support member and the adjacent end of said shank portion for keying the support member to the shank portion, a drawbar fixed to said support member and extending through the bore in said shank portion, means at the end of said drawbar opposite the support member for placing the drawbar under a tensile prestress thereby to clamp the support member to the end of the shank portion and to place the shank portion in compression, said shank portion having a cylindrical recess extending therein from the support member end and through which said drawbar extends on the axis, and a plurality of heavy discs in said recess surrounding said drawbar and having freedom of lateral movement in the recess for damping out vibrations in the boring bar.

5. In a boring bar; a cemented carbide shank portion with the bore extending axially therethrough, a steel cutting element support member at one end of said boring bar, key means disposed between said support member and the adjacent end of said shank portion for keying the support member to the shank portion, a drawbar fixed to said support member and extending through the bore in said shank portion, means at the end of said drawbar opposite the support member for placing the drawbar under a tensile prestress thereby to clamp the support member to the end of the shank portion and to place the shank portion in compression, a cylindrical recess extending into said shank portion from the support member end thereof coaxially with said drawbar, a plurality of rings of heavy material in said recess in face to face engagement surrounding said drawbar, said rings varying slightly from each other in diameter and having a slight clearance inside said recess so that they can move laterally in the recess and strike against the lateral walls thereof, and spring means in said recess holding said rings in face to face engagement.

6. In a boring bar; an elongated cemented carbide shank portion having a longitudinal bore therethrough, said bore including a larger diameter recess portion at one end of the shank portion, a steel cutting element support member at said one end of the shank portion having a cylindrical projection closely fitting into the outer end of said recess portion, a ring key between the support member and the end of the shank portion having axial lugs on its opposite faces, said support member and shank portion being formed with notches receiving said lugs, a drawbar extending through the bore in said shank portion and connected to said support member and having at its end opposite the support member means for stressing the drawbar in tension to clamp the support member to the shank portion and to place the shank portion in compression, means sealing the drawbar to the support member and also to the shank portion and also for sealing the projection on the support member to the shank portion thereby to seal said recess, a plurality of rings of heavy material in the said recess differing slightly in diameter from each other and having a small clearance from the wall of said recess and having a greater clearance around said drawbar, spring means urging said rings into face to face engagement, and a passage extending axially through the drawbar for supplying coolant to the cutting region adjacent said support member.

7. In a boring bar; an elongated hollow cemented carbide shank, a steel cutting element support member at one end of said shank, a cylindrical portion on the support member fitting into the end of the hollow shank, a drawbar fixed to said cylindrical portion of said support member and extending axially through the shank, means at the end of the drawbar opposite the support member for preloading said drawbar in tension to a predetermined measured degree, and a key member surrounding said cylindrical portion of said support member and disposed between the support member and the adjacent end of said shank and drivingly interconnecting the shank and the support member, said key comprising a ring having circumferentially spaced lugs extending axially from opposite sides thereof and said support member and shank being formed with axial notches for receiving said lugs, said drawbar having an axial bore and a passage in said support member communicating therewith for a supply of coolant through the drawbar to the cutting region adjacent said support member.

References Cited by the Examiner

UNITED STATES PATENTS

| | | |
|---|---|---|
| 1,794,361 | 3/31 | Armitage et al. |
| 2,230,455 | 2/41 | Githens _____ 77—58 |
| 2,586,157 | 2/52 | Gasser et al. |
| 2,591,115 | 4/52 | Austin. |

WILLIAM W. DYER, Jr., *Primary Examiner.*

JOHN C. CHRISTIE, *Examiner.*